(12) United States Patent
Bin

(10) Patent No.: US 7,449,805 B2
(45) Date of Patent: Nov. 11, 2008

(54) STEPPING MOTOR AND ELECTRONIC APPARATUS

(75) Inventor: Zhou Rong Bin, Dong-Guan (CN)

(73) Assignees: Seiko Instruments Inc., Chiba-Ken (JP); Asia Optical Co., Inc., Taichung (JP)

( * ) Notice: Subject to any disclaimer, the term of this patent is extended or adjusted under 35 U.S.C. 154(b) by 0 days.

(21) Appl. No.: 11/538,591

(22) Filed: Oct. 4, 2006

(65) Prior Publication Data

US 2007/0138901 A1    Jun. 21, 2007

(30) Foreign Application Priority Data

Oct. 9, 2005    (CN) .................. 2005 1 0108179

(51) Int. Cl.
*H02K 37/14* (2006.01)
*H02K 1/12* (2006.01)

(52) U.S. Cl. ..................... 310/49 R; 310/257

(58) Field of Classification Search ............... 310/257, 310/49 R
See application file for complete search history.

(56) References Cited

U.S. PATENT DOCUMENTS 6,829,011 B1 * 12/2004 Higuchi et al. ............ 348/340

6,909,208 B2 *  6/2005 Suzuki et al. ............. 310/49 R
7,071,593 B2 *  7/2006 Matsushita et al. ........ 310/257
2005/0236914 A1 * 10/2005 Horiike .................... 310/49 R

FOREIGN PATENT DOCUMENTS

| JP | 01055022 A | * | 3/1989 |
| JP | H03-112356 | | 3/1991 |
| JP | 2001-078419 | | 3/2001 |
| JP | 2004-289961 | | 10/2004 |

* cited by examiner

*Primary Examiner*—Tran Nguyen
(74) *Attorney, Agent, or Firm*—Grossman, Tucker, Perreault & Pfleger, PLLC

(57) ABSTRACT

A stepping motor includes a rotor having a cylindrical permanent magnet, ring-shaped first and second yoke units that are arranged so as to be mutually stacked along an axis of the rotor, and a pair of lid. Each of the first and second yoke units includes a ring-shaped exciting coil, an outer yoke that includes an outer cylindrical section that accommodates therein the exciting coil, a back face section, and magnetic pole teeth, and an inner yoke that is combined with the outer yoke and includes a ring-shaped ring section formed around the axis, and magnetic pole teeth that are arranged at fixed intervals while alternating at equal intervals in a noncontacting state with respect to the magnetic pole teeth of the outer yoke. The first and second yoke units are stacked while the back face sections thereof are in a mutual surface contact state.

4 Claims, 8 Drawing Sheets

STEPPING MOTOR AND ELECTRONIC APPARATUS

BACKGROUND OF THE INVENTION

1. Field of the Invention

The present invention relates to a stepping motor used as a drive source for a lens drive and the like such as focus and zoom in a digital camera, a camera-fitted mobile telephone, and the like, and an electronic apparatus that includes the stepping motor.

Priority is claimed on Chinese Patent Application No. 200510108179.3, filed Oct. 9, 2005, the content of which is incorporated herein by reference.

2. Description of Related Art

Stepping motors have excellent compatibility with digital control systems, and are recently being frequently used as drive sources for a lens drive and the like such as focus and zoom in electronic apparatuses such as digital cameras and camera-fitted mobile telephones. Use of crow-pole type stepping motors is particularly frequent, since their manufacturing cost can easily be reduced and they are simple to control.

Various types of crow-pole stepping motor have been provided, such as, for example, a two-phase PM type stepping motor that includes two stators (A-phase stator and B-phase stator) incorporated in a cup-shaped housing (e.g., Japanese Unexamined Patent Application, First Publications Nos. 2004-289961 and 2001-78419) and a two-phase PM type stepping motor that does not use a housing (e.g., Japanese Unexamined Patent Application, First Publication No. H03-112356).

As shown in FIG. 7, for example, a two-phase PM type stepping motor 30 using a housing includes a rotor 32 consisting of a cylindrical permanent magnet 31 that is multipole magnetized in a circumferential direction R, an A-phase stator 33 and a B-phase stator 34 that are arranged so as to be mutually stacked along an axis L when disposed around the perimeter of the rotor 32, a housing 35 which the A-phase stator 33 and the B-phase stator 34 are accommodated inside of, and a bracket 36 that rotatably supports the rotor 32 after sealing the housing 35 with a lid.

The A-phase stator 33 and the B-phase stator 34 have identical configurations, including an exciting coil 42 formed by winding a coil winding 41 around the outer periphery of a ring-shaped bobbin 40 of resin material, and a pair of yokes 43 that enclose the exciting coil 42 from both sides along the direction of the axis L. A plurality of pole teeth 44 are formed in each of the pair of yokes 43, which enclose the bobbin 40 from both sides while being guided by a guide groove (not shown) formed in an inner peripheral face of the bobbin 40. At this time, the pole teeth 44 of the pair of yokes 43 are combined with the bobbin with their pitches deviate so that they sequentially arranged in a noncontacting state in the circumferential direction R. An inner peripheral face of the housing 35 contacts the outer periphery of the pair of yokes 43. Ends of the coil winding 41 wound around the exciting coil 42 are connected to external connectors 45 of the bobbin 40, enabling them to be electrically connected to an external component (not shown), such as a circuit component.

Incidentally, the external connectors 45 of the bobbin 40 are exposed to the outside via a notch (not shown) formed in the housing 35.

In contrast, as shown in FIG. 8, in a two-phase PM type stepping motor 50 that does not use a housing, one yoke unit 51 includes an inner yoke 52, a cup-shaped outer yoke 53, and an exciting coil 42; the yokes 52 and 53 are arranged so as to surround the periphery of the exciting coil 42. The stepping motor 50 is secured such that two of the yoke units 51 are enclosed from each side by a pair of brackets 54.

In FIG. 8, constituent parts which are identical to those of the stepping motor 30 shown in FIG. 7 are represented by identical reference symbols and are not repetitiously explained.

However, in the conventional stepping motors described in Japanese Unexamined Patent Application, First Publications Nos. 2004-289961 and 2001-78418 mentioned above, the following problems remain.

That is, in the stepping motor using a housing, because the housing 35 is constituted by the same members as the A-phase stator 33 and the B-phase stator 34 as shown in FIG. 7, the flow of magnetic flux from the rotor magnet of either one of the A-phase stator 33 and the B-phase stator 34 adversely affects the other.

This will be explained specifically using a pattern diagram of a magnetically equivalent circuit shown in FIG. 9. First, upon receiving magnetic flux from the rotor magnet, magnetic fluxes having a phase difference of 90 degrees flow through the stators 33 and 34. Ideally, the magnetic flux in one stator 33 (34) flows independently of that in the other stator 34 (33) and does not interfere with it.

However, in the conventional stepping motor 30, the magnetic circuits of the stators 33 and 34 become connected via the housing 35 as described above. In addition, contacting portions of their components inevitably have magnetic resistance. Magnetic resistance occurs at a total of five locations, namely locations (P1) where the pair of yokes 43 contact the housing 35 (four locations) and a location (P2) where the pair of yokes 43 surface-contact each other (one location).

Consequently, the flow of magnetic flux is not ideal, and increase in mutual magnetic interference between the stators 33 and 34 makes it difficult to reduce residual torque (detention torque). The resultant torque ripple makes it impossible to achieve smooth rotation, and problems such as vibration and noise are liable to arise.

In addition to the five locations of magnetic resistance, the direct flow of flux through the housing 35 makes the problem particularly noticeable.

On the other hand, with regard to the stepping motor 50 that does not use a housing shown in FIG. 8, although there is no direct flux flowing through the housing 35, as shown in FIG. 10, magnetic resistance occurs at a total of four locations, namely locations (P3) where the inner yoke 52 and the outer yoke 53 of the yoke units 51 contact each other (two locations), a location (P4) where both outer yokes 53 contact each other (one location), and a location (P5) where both inner yokes 52 surface-contact each other (one location).

Effects of mutual magnetic interference, while not as marked as in the stepping motor 30 using the housing 35, are nevertheless noticeable, and it is difficult to reduce residual torque. This is liable to result in similar problems such as vibrations and noise.

SUMMARY OF THE INVENTION

The present invention has been made in view of the above circumstances. It is an object of the invention to provide a stepping motor that can noticeably reduce mutual magnetic interference, reduce residual torque, and reduce vibration and noise while achieving a smooth rotation. Another object is to provide an electronic apparatus including the stepping motor.

The invention uses the following means to achieve these objects.

A stepping motor of the invention includes a rotor including a cylindrical permanent magnet that is multipole magnetized in a circumferential direction; ring-shaped first and second yoke units that are arranged so as to be mutually stacked along an axis of the rotor while surrounding a periphery of the rotor; and a pair of lid members that enclose the first and second yoke units from both sides thereof along the axis, and support the rotor so as to be rotatable around the axis. Each of the first and second yoke units includes a ring-shaped exciting coil; an outer yoke that includes an outer cylindrical section that is formed in a cylindrical shape around the axis and accommodates therein the exciting coil, a back face section that bends at an angle of 90 degrees over a predetermined distance toward the axis from an outer edge of one side of the outer cylindrical section, and a plurality of magnetic pole teeth that bend at an angle of 90 degrees from the back face section substantially parallel with the axis and are arranged at fixed intervals in the circumferential direction; and an inner yoke that is combined with the outer yoke and includes a ring-shaped ring section formed around the axis, and a plurality of magnetic pole teeth that bend at an angle of 90 degrees from an inner peripheral face of the ring section substantially parallel with the axis and are arranged at fixed intervals in the circumferential direction of the exciting coil while alternating at equal intervals in a noncontacting state with respect to the magnetic pole teeth of the outer yoke. The first and second yoke units are stacked while the back face sections thereof are in a mutual surface contact state.

The stepping motor of the invention is a crow-pole two-phase PM type stepping motor including the rotor having a permanent magnet, the first yoke unit that forms an A-phase stator, the second yoke unit that forms a B-phase stator, and a pair of lid members that enclose the first and second yoke units from both sides along the axis and also support the rotor so as to be rotatable around the axis.

In particular, instead of using a conventional housing, the stepping motor has first and second yoke units that are constituted by an outer yoke and an inner yoke that surround an exciting coil. That is, the exciting coil is accommodated between the plurality of magnetic pole teeth and the cylindrical section of the outer yoke. The exciting coil is now mounted on the back face section that connects one end side of the cylindrical section to the magnetic pole teeth. By combining the inner yoke with the outer yoke in this state, the exciting coil becomes enclosed by the inner and outer yokes. Consequently, the inner and outer yokes constitute a magnetic circuit for magnetic flux generated by the exciting coil. At this time, the magnetic pole teeth of the inner yoke and the magnetic pole teeth of the outer yoke are combined such that they are arranged alternately and at equal intervals in the circumferential direction in a noncontacting state.

The first and second yoke units having this configuration are stacked with their back face sections surface-contacting each other. That is, the outer yokes, which are formed in U-shapes by the cylindrical sections, the back face sections, and the magnetic pole teeth, are stacked with their back face sections surface-contacting each other.

Consequently, there are a total of three contacting portions which become magnetically resistant, namely a location where the outer yokes surface-contact each other, and locations where the inner yokes and the outer yokes of the first and second yoke units contact each other (locations where the cylindrical sections of the outer yokes contact the ring sections of the inner yokes). This reduces the number of locations where magnetic resistance is generated in comparison with a example using a conventional housing where there are magnetic resistances at five locations, and another conventional example that does not use a housing and wherein a conventional stepping motor including magnetic resistances at four locations.

In addition to reducing locations where magnetic resistance is generated, if we consider the flow of magnetic flux between the first and second yoke units, while a conventional stepping motor generates flux at two locations, namely a location where faces of the inner yokes contact each other and a location where both outer yokes contact each other, in contrast the stepping motor of the invention generates flux at only one location, namely the location where the faces of the outer yokes contact each other.

Since magnetic mutual interference can thereby be noticeably suppressed in comparison with a stepping motor that does not use a conventional housing, effects of magnetic flux generated by the first and second yoke units are less severe. Therefore, residual torque can thereby be reduced in comparison with a conventional configuration, achieving smooth rotation and reducing vibration and noise.

In the stepping motor of the invention, the exciting coil may include: a ring-shaped bobbin of nonmagnetic material that includes an external connection terminal; and a coil winding that is wound around an outer peripheral face of the bobbin, an end of the coil winding being connected to the external connection terminal. A guide groove may be formed in an inner peripheral face of the bobbin, which guides and locates the magnetic pole teeth of the outer yoke and the inner yoke at predetermined positions, respectively.

According to the stepping motor of the invention, since the exciting coil can be manufactured by winding the coil winding around the outer peripheral face of the bobbin, manufacture is easy. Furthermore, the number of windings and the size of the exciting coil can be reliably obtained as desired. Moreover, since the bobbin includes external connection terminals, the bobbin can be reliably and electrically connected to external components such as circuit components by winding the ends of the coil winding around the external connection terminals.

Since the guide groove for guiding the magnetic pole teeth of the yokes is formed in the inner peripheral face of the bobbin, when the outer yoke, the exciting coil, and the inner yoke are combined, the magnetic pole teeth can be reliably arranged alternately and at equal intervals in the circumferential direction in a noncontacting state. This makes assembly more precise. Therefore, unwanted magnetic leakage can be reduced, and the torque performance can be increased.

An electronic apparatus of the invention includes the stepping motor of the invention.

Since the electronic apparatus of the invention includes the stepping motor wherein residual torque is reduced in comparison with a conventional stepping motor, and vibrations and noise are reduced while achieving smooth rotation, the drive force of the stepping motor can be used to drive various mechanisms quietly and smoothly.

This can increase performance and reliability.

The electronic apparatus of the invention can include a camera module including a lens body arranged so as to be movable along an optical axis, a lens driving means that moves the lens body along the optical axis in conjunction with the rotation of the rotor, and an imaging element that is arranged on the optical axis.

In the electronic apparatus of the invention, when the rotor is rotated, the lens driving means moves the lens body freely along the optical axis. This enables the distance between the imaging element arranged on the optical axis and the lens body to be adjusted as desired. Therefore, an image can be taken while performing an operation such as zooming and focusing. In particular, since the stepping motor has reduced vibrations and reduce noise, operations such as zooming and focusing can be performed quietly and smoothly.

According to the stepping motor of the invention, mutual magnetic interference can be noticeably reduced and a sufficiently reduced residual torque performance can be stably obtained, enabling vibrations and noise to be reduced while achieving smooth rotation.

According to the electronic apparatus of the invention, when using the driving force of the stepping motor to drive various mechanisms, they can be driven quietly and smoothly, thereby improving performance and reliability.

DETAILED DESCRIPTION OF THE INVENTION

Embodiments of a stepping motor and an electronic apparatus according to the invention will be explained with reference to FIGS. 1 to 6.

Figure 1:
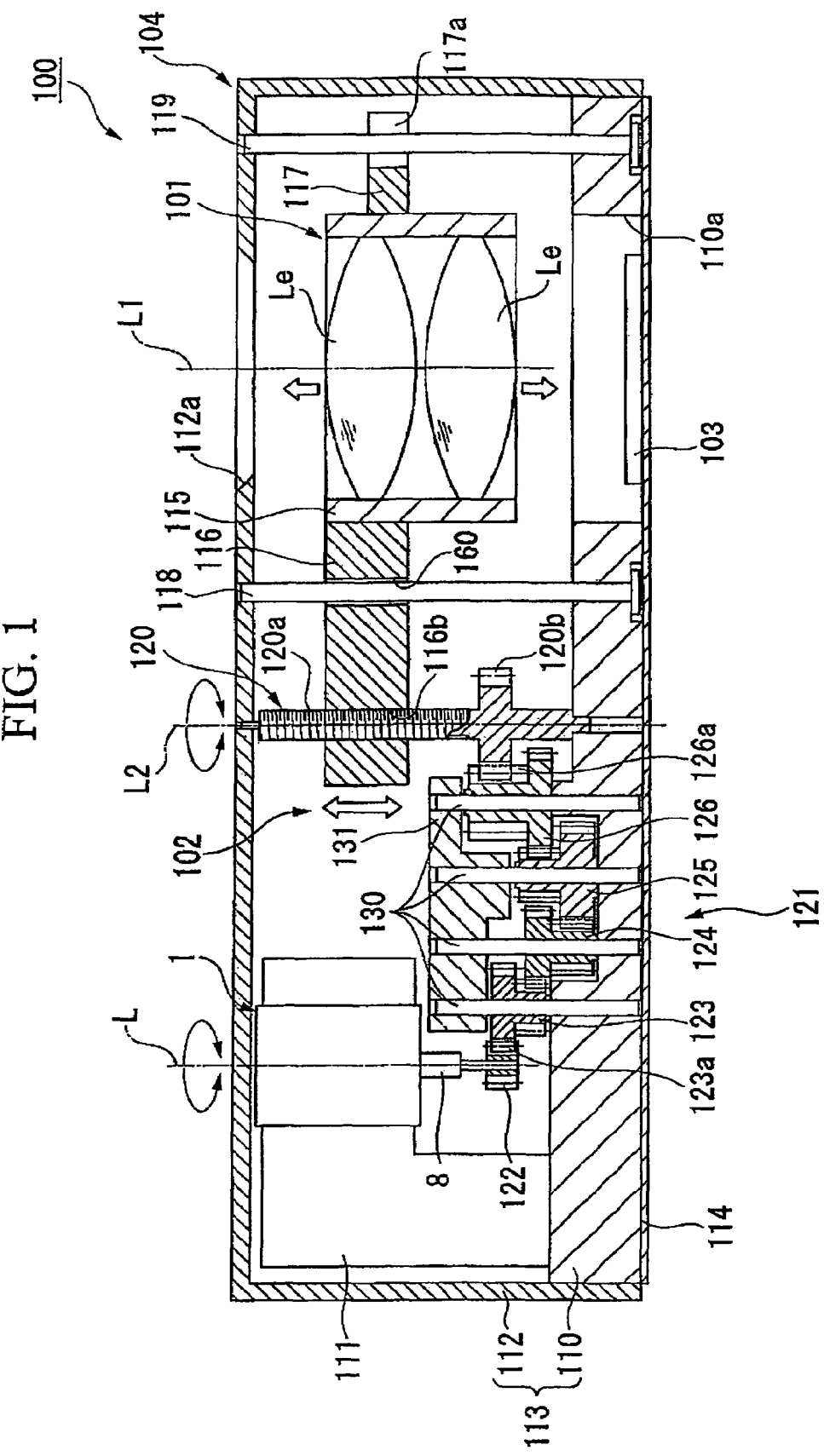
FIG. 1 is a cross-sectional view of an embodiment of an electronic apparatus including a stepping motor according to the invention.

As shown in FIG. 1, a camera-fitted mobile telephone (electronic apparatus) 100 of this embodiment includes a stepping motor 1, a lens body 101 movably arranged along an optical axis L1, a lens driving unit 102 that moves the lens body 101 along the optical axis L1 in conjunction with the rotation of a rotor 3 (described below) of the stepping motor 1, and a camera module 104 that includes an imaging element 103 arranged on the optical axis L1.

Figure 2:
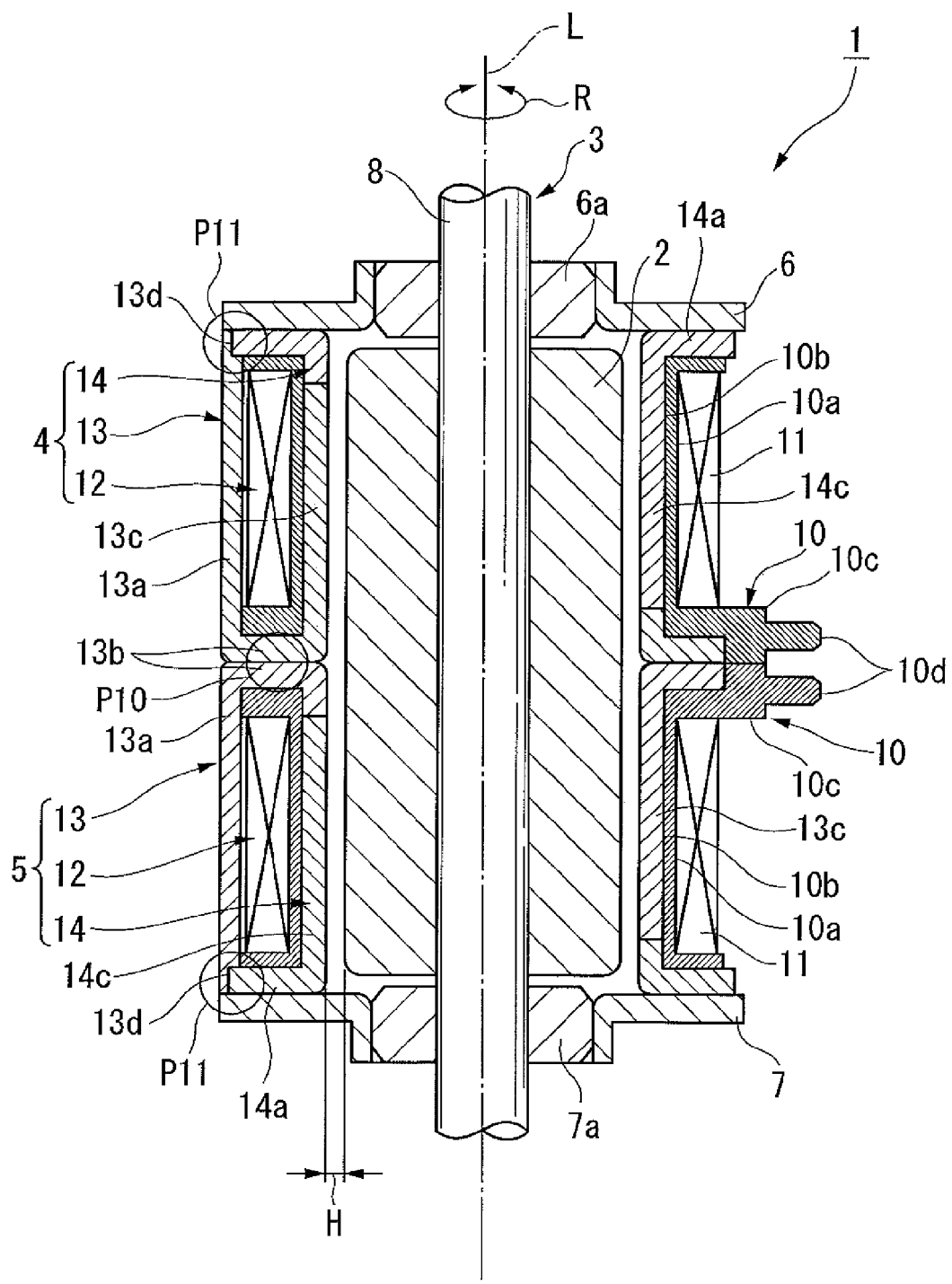
FIG. 2 is a cross-sectional view of an embodiment of the stepping motor shown in FIG. 1.
Figure 3:
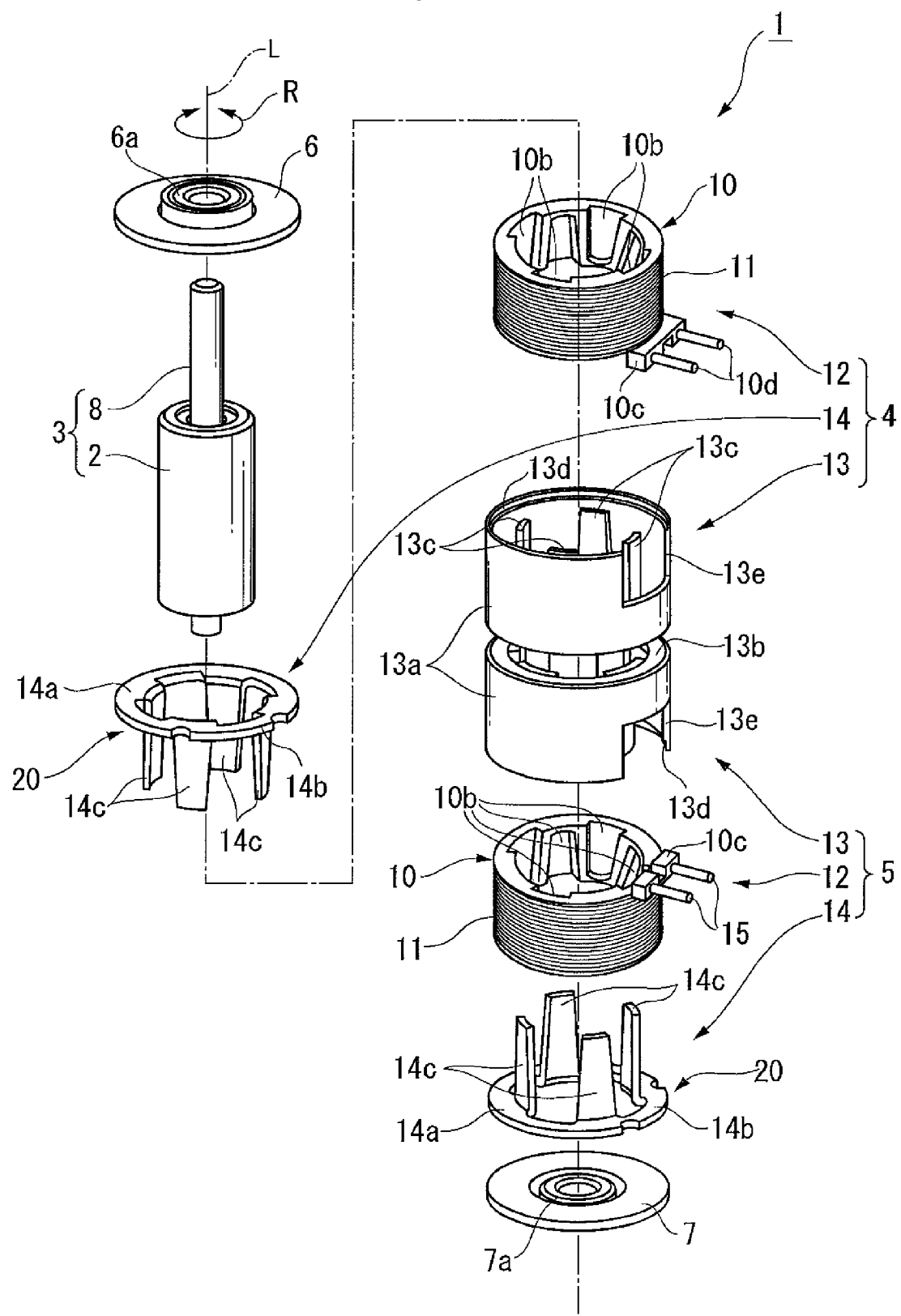
FIG. 3 is an exploded perspective view of the stepping motor shown in FIG. 2.
Figure 4:
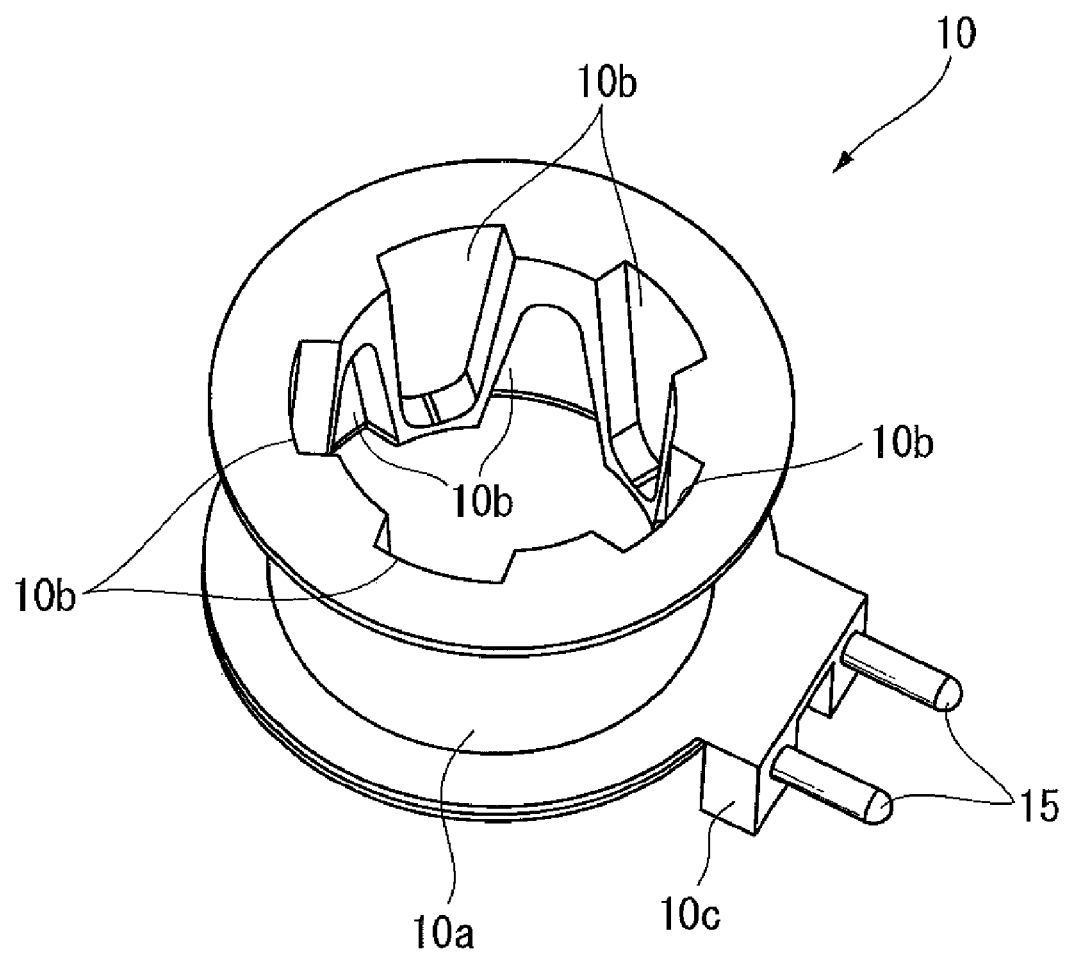
FIG. 4 is a perspective view of a bobbin of the stepping motor shown in FIG. 1.

As shown in FIGS. 2 and 3, the stepping motor 1 is a crow-pole two-phase PM type stepping motor including a rotor 3 having a cylindrical permanent magnet 2 that is multipole magnetized in a circumferential direction R, a first yoke unit 4 and a second yoke unit 5 that are ring-shaped and arranged so as to be mutually stacked along an axis L of the rotor 3, and a pair of plates (a pair of lid members) 6 and 7 that enclose the first and second yoke units 4 and 5 from both sides along the axis L and also support the rotor 3 such that it can rotate around the axis L.

The permanent magnet 2 is cylindrical such that it surrounds the periphery of a shaft 8 extending along the axis L, and is secured to the shaft 8 in one piece therewith. The magnetic pole of the permanent magnet 2 is divided into, for example, eight parts in the circumferential direction R, and magnetized such that these parts have alternately different polarities. In other words, the permanent magnet 2 and the shaft 8 together constitute the rotor 3.

The shaft 8 and the permanent magnet 2 are secured by an adhesive agent or the like provided between them.

The first yoke unit 4 and the second yoke unit 5 have identical configurations. Accordingly, hereinafter, the first yoke unit 4 will be described in detail.

The first yoke unit 4 forms an A-phase stator, and includes a ring-shaped exciting coil 12 constituted as shown in FIG. 3 by a bobbin 10 and a coil winding 11 that is wound around the outer periphery of the bobbin 10, an outer yoke 13, and an inner yoke 14.

The bobbin 10 is formed in a ring-shape from resin material. A groove section 10a for enabling the coil winding 11 to be wound is provided in the outer peripheral face of the bobbin 10; in addition, guide grooves 10b are arranged at predetermined positions in an inner peripheral face in order to guide magnetic pole teeth (crow poles; inductors) 13c and 14c (described later) of the inner yoke 14 and the outer yoke 13.

Outwardly protruding sections 10c are provided in the outer periphery of the bobbin 10, and metallic external connection terminals 10d to which the ends of the coil winding 11 are connected and for electrically connecting external components such as circuit components (not shown) are provided at the protrusions 10c. As shown in FIG. 2, the coil winding 11 wound in the groove section 10a of the bobbin 10 is accommodated in the depth of the groove section 10a such that it does not protrude to the outside from the outer periphery of the bobbin 10.

The outer yoke 13 includes, for example, an outer cylindrical section 13a that is made from a magnetic material such as pure iron and formed in a cylindrical shape around the axis L, this outer cylindrical section 13a enabling the exciting coil 12 to be internally accommodated, a back face section 13b that bends at an angle of 90 degrees over a predetermined distance toward the axis L from the outer edge of one side of the outer cylindrical section 13a, and a plurality of magnetic pole teeth 13c that bend at an angle of 90 degrees over a predetermined distance from the back face section 13b substantially parallel with the axis L while being guided in the guide grooves 10b of the bobbin 10, and are arranged at fixed intervals in the circumferential direction R opposite an inner peripheral face of the bobbin 10.

Incidentally, this embodiment describes an example where four magnetic pole teeth 13c are formed at fixed intervals in the circumferential direction R.

The outer cylindrical section 13a is slightly larger than the height and outer diameter of the exciting coil 12, and has a step 13d for positioning the inner yoke 14 along the axis L in the outer edges of its other end side. A notch 13e for positioning the inner yoke 14 with respect to the circumferential direction R, and for positioning the exciting coil 12 in two directions, i.e., the axis L direction and the circumferential direction R, is provided in one portion of the outer cylindrical section 13a. This positioning is described in detail later.

The back face section 13b bends toward the axis L from the outer edge of one end side of the outer cylindrical section 13a in accordance with the thickness of the exciting coil 12. That is, it bends so as to provide an interval that allows the exciting coil 12 to be accommodated between the outer cylindrical section 13a and the magnetic pole teeth 13c.

The magnetic pole teeth 13c are provided on the inner side of the outer cylindrical section 13a, and their lengths are adjusted such that their tips are near the step 13d. Also, their widths decrease gradually towards their tips, i.e., they are trapezoidal in shape. As described above, when the exciting coil 12 is accommodated between the magnetic pole teeth 13c and the outer cylindrical section 13a, the magnetic pole teeth 13c are guided in the guide grooves 10b of the bobbin 10 such that they face the inner peripheral face of the bobbin 10.

Similar to the outer yoke 13, the inner yoke 14 is formed from a metallic material made from a magnetic body such as, for example, pure iron, and includes a ring section 14a formed around the axis L in the same manner as the back face section 13b, and the magnetic pole teeth 14c that bend at an angle of 90 degrees from an inner periphery of the ring section 14a substantially parallel with the axis L, and are arranged at fixed intervals in the circumferential direction R while being guided in the guide grooves 10b of the bobbin 10 such that they are opposite the inner peripheral face of the bobbin 10. In addition, the magnetic pole teeth 14c are arranged at equal intervals so as to alternate with magnetic pole teeth 13c of the outer yoke 13 in the circumferential direction R in a noncontacting state.

Incidentally, this embodiment describes an example where, similar to the magnetic pole teeth 13c of the outer yoke 13, four magnetic pole teeth 14c of the inner yoke 14 are formed at fixed intervals in the circumferential direction R.

When the inner yoke 14 is combined with the outer yoke 13, the ring section 14a contacts the step 13d of the outer yoke 13 and positions the inner yoke 14 along the axis L.

A protruding section 14b that fits into the notch 13e of the outer yoke 13 is provided in one portion of the outer peripheral side of the ring section 14a. This enables the inner yoke 14 and the outer yoke 13 to be combined in a state of being positioned with respect to circumferential direction R.

That is, the step 13d, the notch 13e, and the protruding section 14b constitute a yoke positioning means 20 for positioning the outer yoke 13 and the inner yoke 14 when they are combined.

The lengths of the magnetic pole teeth 14c of the inner yoke 14 are adjusted such that their tips are near the back face section 13b of the outer yoke 13. Similar to the magnetic pole teeth 13c of the outer yoke 13, their widths decrease gradually towards their tips, i.e., they are trapezoidal in shape. The magnetic pole teeth 14c are arranged facing the inner peripheral face of the bobbin 10.

The magnetic pole teeth 14c of the inner yoke 14 are guided by the guide grooves 10b of the bobbin 10 such that they intrude between the magnetic pole teeth 13c of the outer yoke 13 when the protruding section 14b is fitted into the notch 13e, i.e., such that their pitches deviate. Consequently, when the outer yoke 13 and the inner yoke 14 are combined, the magnetic pole teeth 13c and 14c are alternately arranged at equal intervals in a noncontacting state in the circumferential direction R.

The first yoke unit 4 forming the A-phase stator and the second yoke unit 5 forming the B-phase stator having the above configurations are arranged so as to be stacked while the back face sections 13b of the outer yokes 13 are in a surface contacting state, and are joined together by welding. The magnetic pole teeth 13c of the outer yoke 13 of the first yoke unit 4 and the magnetic pole teeth 14c of the inner yoke 14 of the second yoke unit 5 are joined such that their magnetic pole teeth pitches deviate by one-quarter pitch. In this state, the notches 13e of both outer yokes 13 match in the axis L direction.

The pair of plates 6 and 7 are disk-shaped, and are the same size as the outer diameter of the outer yokes 13. The plates 6 and 7 enclose the stacked first and second yoke units 4 and 5 from both sides, and are joined to them by welding. The pair of plates 6 and 7 respectively include bearing sections 6a and 7a that allow the shaft 8 to be inserted through them and support it such that it can rotate around the axis L.

As shown in FIG. 1, the stepping motor of this configuration is attached and secured to a motor support member 11 that is secured to a first support plate 110. A cover 112 is U-shaped in cross-section and connected to the first support plate 110 such that it covers the top face of the first support plate 110 while leaving an internal space. The first support plate 110 and the cover 112 constitute a casing 113 of the camera module 104.

A controller, a motor driver, a signal processor (not shown), and the imaging element 103 are mounted on a circuit substrate 114, which is attached to the reverse face of the first support plate 110. The installation position of the imaging element 103 is adjusted such that it is accommodated in an opening 110a provided in the first support plate 110. The imaging element 103 is a semiconductor device, such as a CCD or a CMOS.

The controller includes a CPU, a memory, and such like, and controls operations of the imaging element 103 and of the entire camera module 104. The motor driver supplies current to the winding ends of the exciting coil 12 of the stepping motor 1. The signal processor processes signals output from the imaging element 103, and outputs them to the controller.

The lens body 101 is arranged above the imaging element 103. The lens body 101 includes a cylindrical lens holder 115, and one or a plurality of lenses Le which are secured to an inner peripheral face of the lens holder 115. As described above, the installation position of the imaging element 103 is adjusted such that it is arranged on the optical axis L1 of the lenses Le. Moreover, a lighting hole 112a is provided in the cover 112 above the optical axis L1 of the lenses Le.

A pair of convexities 116 and 117 are provided on the outer periphery of the lens holder 115 such that they face each other with the optical axis L1 between them. Guide holes 116a and 114c, such as through-holes and grooves which a pair of guide axes 118 and 119 can be inserted through, are formed respectively in the pair of convexities 116 and 117.

The pair of guide axes 118 and 119 are, for example, round bars arranged parallel to the optical axis L1 such that the lens body 101 is sandwiched between them, both their ends being secured to the cover 112 and the first support plate 110 respectively. That is, the lens body 101 is supported by the pair of guide axes 118 and 119 while being contained in an internal space of the casing 113, and is arranged between the imaging element 103 and the lighting hole 112a. In addition, the lens body 101 can slide freely between the pair of guide axes 118 and 119 and the pair of guide holes 116a and 114c. This enables it to move in the optical axis L1 direction along the pair of guide axes 118 and 119.

Of the convexities 116 and 117, the convexity 116 extends in a direction leading away from the lens body 101, and its tip has a nut section 116b that screws into a screw section 120a of a lead screw axis 120.

Similarly, the lead screw axis 120 is arranged parallel to the optical axis L1 at a position adjacent to one of pair of guide axes 118 and 119, namely the guide axis 118. Both ends of the lead screw axis 120 are secured to the cover 112 and the first support plate 110 such that it can rotate. This enables the lead screw axis 120 to rotate around an axis L2 that is parallel to the optical axis L1.

A driven gear 120b is molded together with the lead screw axis 120, and is formed on the first support plate 1 side thereof. A portion on the cover 1 side of the tip of the driven gear 120b forms the screw section 120a where a screw groove is formed in the outer peripheral face. As described above, the nut section 116b of the convexities 116 and 117 is screwed into the screw section 120a. Since the lens body 101 is now supported by the pair of guide axes 118 and 119, when the lead screw axis 120 is rotated around the axis L2, the nut section 116b moves in the axis L2 direction without following the rotation of the lead screw axis 120. In other words, its rotational motion is converted to linear motion.

The driven gear 120b of the lead screw axis 120 is connected to the shaft 8 of the stepping motor 1 via a transmission mechanism 121, and rotates around the axis L2 in conjunction with the rotation of the shaft 8.

Specifically, a drive gear 122 is secured to one end side of the shaft 8 of the stepping motor 1 and is engaged with an input gear 123a of an intermediate gear 123. The other end side of the shaft 8 of the stepping motor 1 is rotatably supported by a bearing (not shown) that is secured to the cover 112.

The intermediate gear 123 is sequentially is engaged with three additional intermediate gears 124, 125, and 126. An output gear 126a of the intermediate gear 126 arranged adjacent to the lead screw axis 120 is engaged with the driven gear 120b. Therefore, the rotational force of the shaft 8 is decelerated in three stages by the intermediate gears 123, 124, 125, and 126, and is thereafter transmitted to the lead screw axis 120.

The intermediate gears 123, 124, 125, and 126 rotate around respective axis members 130. Both ends of each axis member 130 are rotatably supported by the first support plate 110 and a second support plate 131 arranged opposite the first support plate 110. That is, the intermediate gears 123, 124, 125, and 126, the drive gear 122, and the axis members 130 constitute the transmission mechanism 121.

The nut section 116b, the lead screw axis 120, and the transmission mechanism 121 constitute a lens driving means 102 that moves the lens body 101 in conjunction with the rotation of the rotor 3, i.e., the shaft 8.

Subsequently, a method of assembling the stepping motor 1 of this embodiment will be explained while referring to FIGS. 2 and 3. The following explanation of an assembly method is merely one example, and the invention is not limited to this assembly sequence.

Firstly, the outer yokes 13 of the first and second yoke units 4 and 5 are stacked while the back face sections 13b thereof are in a surface contact state. At this time, a jig (not shown) is used to stack them precisely such that the magnetic pole teeth 13c of the outer yokes 13 deviate by a predetermined angle around the axis L. In this state, the notches 13e of the outer yokes 13 match with respect to the axis L direction (i.e., they are in a straight line). After positioning, the outer yokes 13 are welded together.

The exciting coil 12 is then accommodated inside the outer yoke 13 of the first yoke unit 4. That is, the exciting coil 12 is accommodated between the plurality of magnetic pole teeth 13c and the outer cylindrical section 13a of the outer yoke 13. At this time, the protruding section 10c of the bobbin 10 fits into the notch 13e of the outer yoke 13, and the exciting coil 12 is accommodated such that the magnetic pole teeth 13c are guided by the guide grooves 10b of the bobbin 10. This enables the exciting coil 12 to be accommodated in the outer yoke 13 in a positioned state, and arranges the magnetic pole teeth 13c opposite the inner peripheral face of the exciting coil 12.

After accommodating the exciting coil 12, the inner yoke 14 is combined so as to cover the outer yoke 13. The protruding section 14b of the inner yoke 14 now fits into the notch 13e of the outer yoke 13, and the ring section 14a of the inner yoke 14 contacts the step 13d of the outer yoke 13. Therefore, the inner yoke 14 and the outer yoke 13 can be combined in a state where they are reliably positioned with respect to two directions, i.e., the axis L direction and the circumferential direction R. Also at this time, the magnetic pole teeth 14c of the inner yoke 14 are guided in the guide grooves 10b of the bobbin 10.

Thus the magnetic pole teeth 14c of the inner yoke 14 and the magnetic pole teeth 13c of the outer yoke 13 are arranged alternately at equal intervals in the circumferential direction R in a mutually noncontacting state. Similar to the magnetic pole teeth 13c of the outer yoke 13, the magnetic pole teeth 14c of the inner yoke 14 are arranged opposite the inner peripheral face of the exciting coil 12.

Incidentally, when combining the inner yoke 14 and the outer yoke 13, the inner yoke 14 enters inside the outer yoke 13 and does not protrude excessively in the axis L direction.

After temporarily securing the inner yoke 14 and the outer yoke 13 so that the inner yoke 14 does not come free, the second yoke unit 5 is assembled in the same way as the assembly method of the first yoke unit 4 described above. The outer yoke 13 and the inner yoke 14 of the second yoke unit 5 are then temporarily secured.

The rotor 3 is inserted through the first and second yoke units 4 and 5. After inserting the rotor 3, the shaft 8 is inserted through the bearing sections 6a and 7a while attaching the pair of plates 6 and 7 so as to enclose the first and second yoke units 4 and 5 from both sides. As shown in FIG. 2, a jig or the like is used for adjustment such that a predetermined distance H is formed between the permanent magnet 2 and the magnetic pole teeth 13c and 14c of the first and second yoke units 4 and 5.

The pair of plates 6 and 7 are joined to the outer yokes 13 by welding.

Thus the stepping motor 1 can be assembled.

Subsequently, an example of operating the stepping motor 1 configured as described above, and moving the camera module 104 of the camera-fitted mobile telephone 100 to take a zoom image of an object (not shown) will be explained.

Firstly, when the user performs a zoom operation while confirming the object on a display panel (not shown) of the camera-fitted mobile telephone 100, the controller mounted on the circuit substrate 114 of the camera module 104 supplies a current to the exciting coils 12 in order to operate the stepping motor 1. When the current flows to the exciting coils 15, the magnetic pole teeth 16a and 17a of the first and second yoke units 4 and 5 are sequentially excited to N-poles and S-poles. As a result, the rotor 3 can be rotated around the axis L.

As the rotor 3 rotates, the shaft 8 also rotates around the axis L, and so does the drive gear 122 secured to one end side of the shaft 8. The rotation of the drive gear 122 makes the engaged intermediate gears 123, 124, 125, and 126 rotate one after another around their axis members 130, and, after decelerating to a predetermined rotation rate, they rotate the driven gear 120b of the lead screw axis 120. Consequently, the screw section 120a rotates at a predetermined rotation rate around the axis L2.

The nut section 116b of one convexity 116 interlocking with the screw section 120a moves along the axis L2 direction in conjunction with the rotation of the lead screw axis 120. Consequently, the entire lens body 101 secured to the convexity 116 moves along the guide axes 118 and 119 in the axis L2 direction, i.e., the optical axis L1 direction. As a result, the lenses Le secured by the lens holder 115 can be moved near the imaging element 103, achieving a zoom. This enables user to take a zoom image of the object.

While this example describes a zoom, focusing can be performed freely by changing the rotational direction of the rotor 3 and moving the lens body 101 toward/away from the imaging element 103.

In particular in the stepping motor 1 of this embodiment, the first and second yoke units 4 and 5 are stacked while the back face sections 13b thereof are in a surface contact state, i.e., the outer yokes 13 which have cross-sectional U-shapes constituted by the outer cylindrical sections 13a, the back face sections 13b, and the magnetic pole teeth 13c, are stacked while the back face sections 13b are in a surface contact state.

Figure 5:
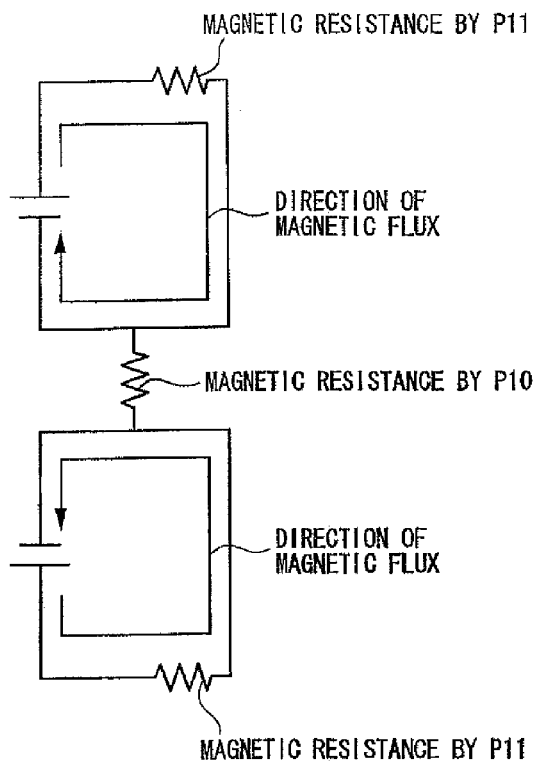
FIG. 5 is a pattern diagram of a magnetically equivalent circuit of the stepping motor shown in FIG. 1.

Therefore, as shown in FIGS. 2 and 5, there are contacting portions that become magnetically resistance at three locations, namely a location where the outer yokes 13 are surface-contacting (P10), locations where the inner yoke 14 and the outer yoke 13 of the first and second yoke units 4 and 5 are contacting (P11). This can reduce locations where magnetic resistance is generated in comparison with a example using a conventional housing where there are magnetic resistances at five locations, and another conventional example that does not use a housing and wherein a conventional stepping motor including magnetic resistances at four locations.

Figure 8:
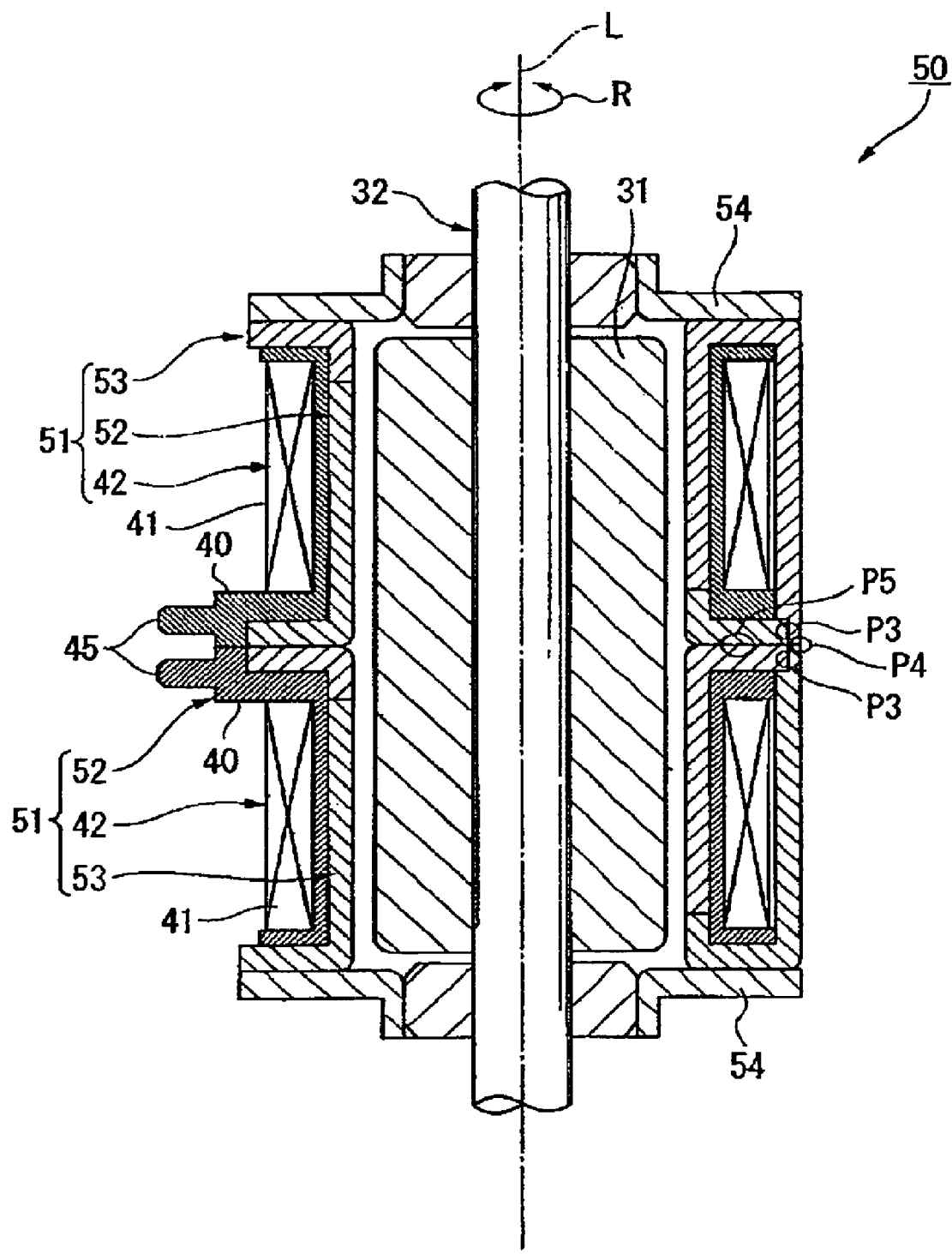
FIG. 8 is a cross-sectional view of one example of a conventional stepping motor that does not include a housing.
Figure 9:
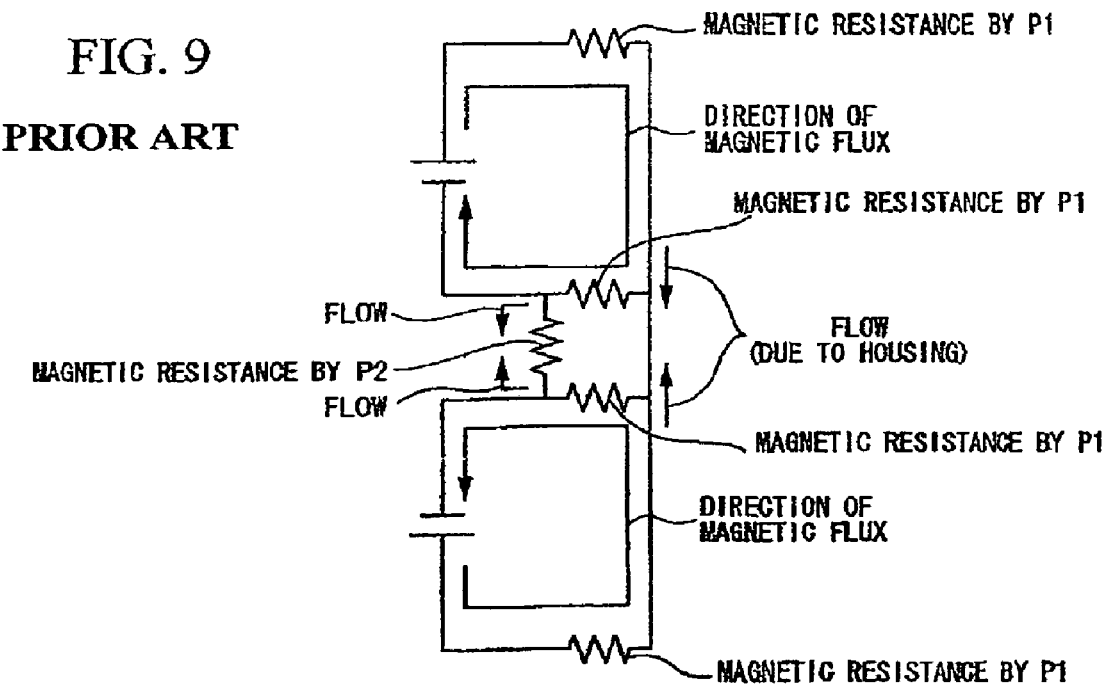
FIG. 9 is a pattern diagram of a magnetically equivalent circuit of the stepping motor shown in FIG. 7.
Figure 10:
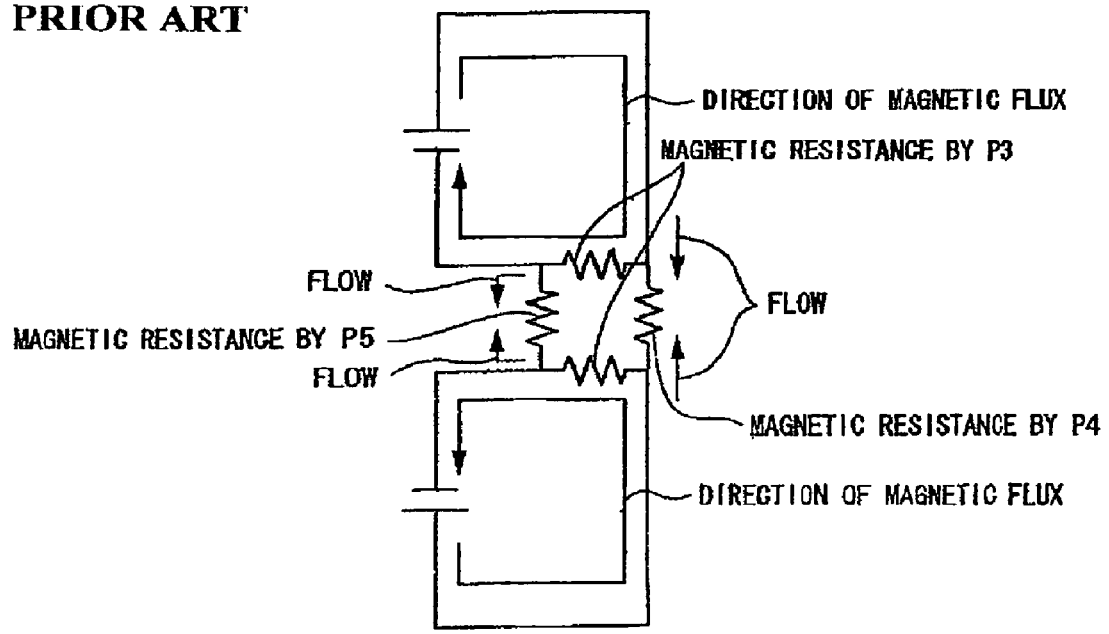
FIG. 10 is a pattern diagram of a magnetically equivalent circuit of the stepping motor shown in FIG. 8.

In addition to reduction of locations where magnetic resistance is generated, if we consider the flow of magnetic flux between the first and second yoke units 4 and 5, while the conventional stepping motor 50 of FIGS. 8 and 10 generates flux at two locations, namely a location where both inner yokes 52 surface-contact each other (P5) and a location where both outer yokes 53 contact each other (P4), in contrast the stepping motor of this embodiment shown in FIGS. 2 and 5 has flux at only one location, namely the location where the outer yokes 13 are surface-contacting (P0).

Figure 6:
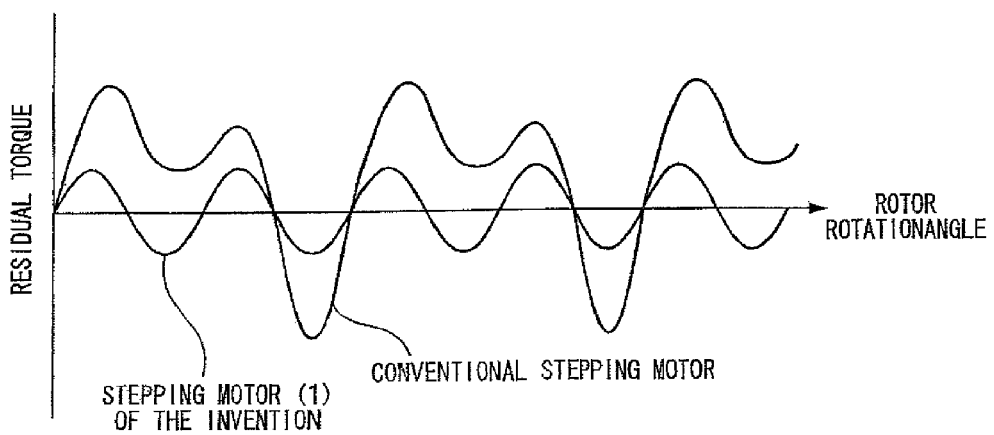
FIG. 6 is diagram of changes in residual torque relating to a rotor rotation angle when the stepping motor shown in FIG. 2 is activated.
Figure 7:
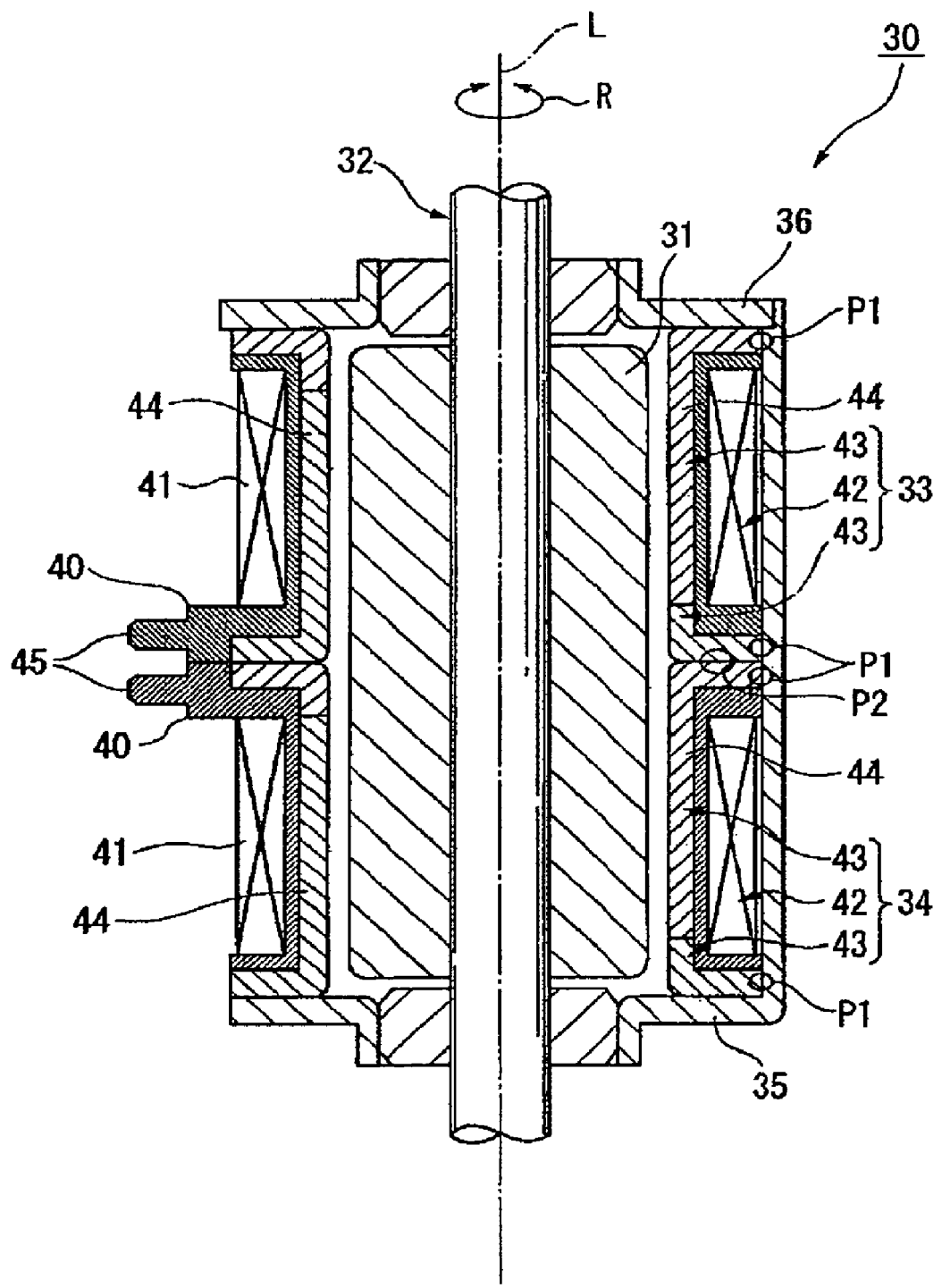
FIG. 7 is a cross-sectional view of one example of a conventional stepping motor including a housing.

As a result, since magnetic mutual interference can be suppressed noticeably in comparison with a stepping motor that does not use a conventional housing, effects of magnetic flux generated by the first and second yoke units 4 and 5 are less severe. As shown in FIG. 6, residual torque can thereby be reduced in comparison with a conventional configuration (peak position and cyclicality are both stable, amplitude is small and residual torque is reduced), achieving smooth rotation and reducing vibration and noise.

Furthermore, instead of using a housing, the configuration is assembled by combining the outer yokes 13, the inner yokes 14, and the exciting coils 12, making it easy to assemble. That is, instead of assembling the first yoke unit 4 (A-phase stator) and the second yoke unit 5 (B-phase stator) separately and then incorporating them in a housing, the constituent components can be assembled sequentially by a series of processes as described above. This makes assembly easier and more precise. Also, since it requires no housing, the configuration can be made smaller.

At the time of assembly, the yoke positioning means 20 enables the inner yokes 14 and the outer yokes 13 to be combined with their respective magnetic pole teeth 14c and 13c reliably arranged alternately and at equal intervals, facing the circumferential direction R in a noncontacting state. This also makes assembly more precise. Therefore, unwanted magnetic leakage can be reduced and the torque characteristic can be enhanced.

The above embodiment is exemplary of the invention and is not to be considered as limitative. Additions, omissions, substitutions, and other modifications can be made without departing from the spirit or scope of the present invention.

For example, while the above embodiment describes an example of a camera-fitted mobile telephone as the electronic apparatus, this is not limitative of the invention. For example, it can be a digital camera and the like.

While in the above embodiment, the rotor has eight magnetic poles and each yoke unit has four magnetic teeth, this is not limitative of the invention, it being possible to change the number of magnetic poles of the rotor to four, six, ten, and the like, and to change the number of magnetic pole teeth of the yokes to two, three, five, and the like.

While in the above embodiment, the exciting coil is formed by winding a coil winding around the outer periphery of a bobbin, this is not limitative of the invention. For example, instead of using a bobbin, a ring-shaped air-core coil with an insulated surface can be used as the exciting coil. This achieves effects similar to those of the embodiment described above. Incidentally, when using an air-core coil, special terminals for connecting the winding ends of the air-core coil can be provided on both yoke units, thereby enabling external circuits such as circuit components to be electrically connected to them.

What is claimed is:

1. A stepping motor comprising:
   a rotor including a cylindrical permanent magnet that is multipole magnetized in a circumferential direction;
   ring-shaped first and second yoke units that are arranged so as to be mutually stacked along an axis of the rotor while surrounding a periphery of the rotor; and
   a pair of lid members that enclose the first and second yoke units from both sides thereof along the axis, and support the rotor so as to be rotatable around the axis,
   each of the first and second yoke units including:
   a ring-shaped exciting coil;
   an outer yoke that includes an outer cylindrical section that is formed in a cylindrical shape around the axis and accommodates therein the exciting coil, a back face section that bends at an angle of 90 degrees over a predetermined distance toward the axis from an outer edge of one side of the outer cylindrical section, and a plurality of magnetic pole teeth that bend at an angle of 90 degrees from the back face section substantially parallel with the axis and are arranged at fixed intervals in the circumferential direction; and
   an inner yoke that is combined with the outer yoke and includes a ring-shaped ring section formed around the axis, and a plurality of magnetic pole teeth that bend at an angle of 90 degrees from an inner peripheral face of the ring section substantially parallel with the axis and are arranged at fixed intervals in the circumferential direction of the exciting coil while alternating at equal intervals in a noncontacting state with respect to the magnetic pole teeth of the outer yoke, wherein
   the first and second yoke units are stacked while the back face sections thereof are in a mutual surface contact state.

2. The stepping motor according to claim 1, wherein
   the exciting coil includes: a ring-shaped bobbin of nonmagnetic material that includes an external connection terminal; and a coil winding that is wound around an outer peripheral face of the bobbin, an end of the coil winding being connected to the external connection terminal, and
   a guide groove is formed in an inner peripheral face of the bobbin, which guides and locates the magnetic pole teeth of the outer yoke and the inner yoke at predetermined positions, respectively.

3. An electronic apparatus comprising the stepping motor according to claim 1.

4. The electronic apparatus according to claim 3, comprising a camera module that includes:
   a lens body arranged so as to be movable along an optical axis;
   a lens driving means that moves the lens body along the optical axis in conjunction with rotation of the rotor; and
   an imaging element arranged on the optical axis.

* * * * *